US008924783B2

(12) United States Patent
Gunabalasubramaniam et al.

(10) Patent No.: US 8,924,783 B2
(45) Date of Patent: Dec. 30, 2014

(54) SELF-MANAGED PROCESSING DEVICE

(71) Applicant: Microsoft Corporation, Redmond, WA (US)

(72) Inventors: Kohulan Gunabalasubramaniam, Seattle, WA (US); Mukesh Karki, Bellevue, WA (US); Narayanan Parthasarathy, Redmond, WA (US); Bohdan Raciborski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/741,242

(22) Filed: Jan. 14, 2013

(65) Prior Publication Data

US 2013/0212433 A1 Aug. 15, 2013

Related U.S. Application Data

(63) Continuation of application No. 13/025,747, filed on Feb. 11, 2011, now Pat. No. 8,356,209, which is a continuation of application No. 11/726,989, filed on Mar. 23, 2007, now Pat. No. 7,913,113.

(51) Int. Cl.
*G06F 11/00* (2006.01)
*G06F 11/14* (2006.01)

(52) U.S. Cl.
CPC ........ *G06F 11/1446* (2013.01); *G06F 11/1451* (2013.01); *G06F 11/1469* (2013.01); *G06F 11/1417* (2013.01); *G06F 11/1461* (2013.01)
USPC .............................................. 714/15; 714/19

(58) Field of Classification Search
USPC .................. 714/2, 15, 19, 20, 21, 30, 31, 38.1
See application file for complete search history.

(56) References Cited

U.S. PATENT DOCUMENTS 5,592,675 A 1/1997 Itoh et al.
5,708,820 A 1/1998 Park et al.
(Continued)

FOREIGN PATENT DOCUMENTS

JP 7056719 3/1995
JP 1031592 2/1998
(Continued)

OTHER PUBLICATIONS

"European Search Report", EP Application 08743875.0, (Sep. 27, 2010), 14 pages.
(Continued)

*Primary Examiner* — Michael Maskulinski
(74) *Attorney, Agent, or Firm* — John Jardine; Kate Drakos; Micky Minhas

(57) ABSTRACT

A processing device may automatically provide protective services and may provide backup services for backing up and restoring user files, system files, configuration files, as well as other information. The processing device may be configured to check one or more performance conditions and perform an action to improve performance based on the one or more performance conditions. The processing device may monitor configuration and file changes and provide a user with a capability to persist or discard configuration changes and/or file changes made by an application during a session. The processing device may include a recovery button or switch, which when selected or pressed may cause the processing device to be restored to an operational state. The processing device may automatically detect instabilities and may automatically attempt to repair possible causes of the instabilities. The processing device may also include an additional chipset, which may perform backup and recovery services.

20 Claims, 11 Drawing Sheets

(56) References Cited

U.S. PATENT DOCUMENTS

| | | | |
|---|---|---|---|
| 5,713,024 | A | 1/1998 | Halladay |
| 5,745,669 | A | 4/1998 | Hugard et al. |
| 5,978,922 | A | 11/1999 | Arai et al. |
| 6,044,475 | A | 3/2000 | Chung et al. |
| 6,205,527 | B1 | 3/2001 | Goshey et al. |
| 6,317,845 | B1 | 11/2001 | Meyer et al. |
| 6,529,966 | B1 | 3/2003 | Willman et al. |
| 6,701,454 | B1 | 3/2004 | Fischer et al. |
| 6,745,345 | B2 | 6/2004 | Cabezas et al. |
| 6,802,025 | B1 | 10/2004 | Thomas et al. |
| 7,080,285 | B2 | 7/2006 | Kosugi et al. |
| 7,111,203 | B2 | 9/2006 | Hu et al. |
| 7,467,328 | B2 | 12/2008 | Roth et al. |
| 7,673,175 | B2 | 3/2010 | Mora et al. |
| 7,913,113 | B2 | 3/2011 | Gunabalasubramaniam et al. |
| 8,356,209 | B2 | 1/2013 | Gunabalasubramaniam et al. |
| 2003/0108039 | A1 | 6/2003 | Shell et al. |
| 2004/0034794 | A1 | 2/2004 | Mayer et al. |
| 2004/0215998 | A1 | 10/2004 | Buxton |
| 2004/0254978 | A1 | 12/2004 | Ibanez et al. |
| 2005/0155031 | A1 | 7/2005 | Wang et al. |
| 2005/0289260 | A1 | 12/2005 | Hamer et al. |
| 2006/0026319 | A1 | 2/2006 | Rothman et al. |
| 2006/0053272 | A1 | 3/2006 | Roth et al. |
| 2006/0161784 | A1 | 7/2006 | Hunter et al. |
| 2006/0184828 | A1 | 8/2006 | Wynn et al. |
| 2007/0162785 | A1 | 7/2007 | Downer et al. |
| 2007/0234115 | A1 | 10/2007 | Saika |
| 2008/0275921 | A1 | 11/2008 | Gunabalasubramaniam et al. |
| 2011/0138225 | A1 | 6/2011 | Gunabalasubramaniam et al. |

FOREIGN PATENT DOCUMENTS

| | | |
|---|---|---|
| JP | 11508070 | 7/1999 |
| JP | 2002324012 | 11/2002 |
| JP | 2004038931 | 2/2004 |
| KR | 102006005829 | 5/2006 |
| TW | I273429 | 2/2007 |
| WO | WO-0142919 | 6/2001 |
| WO | WO-2004090724 | 10/2004 |

OTHER PUBLICATIONS

"Extended European Search Report", European Patent Application No. 11009674.0, (Mar. 23, 2012), 7 pages.

"Final Office Action", U.S. Appl. No. 11/726,989, (Sep. 15, 2010), 11 pages.

"Foreign Office Action", Chinese Application No. 200880009404.X, (Feb. 22, 2012), 9 pages.

"Foreign Office Action", Japanese Application No. 2010-201061, (Jan. 4, 2012), 7 pages.

"Foreign Office Action", Japanese Application No. 2010-501061, (Jun. 23, 2011), 12 pages.

"International Search Report and Written Opinion", Application No. PCT/US2008/056940, (Aug. 14, 2008), 11 pages.

"Machine Translation of portion of JP3068375", Published May 12, 2000 according to data available http://worldwide.espacenet.com/publicationDetails/biblio?DB=EPODOC&II=0&adjacent=true&locale=en_EP&FT=D&date=20000512&CC=JP&NR=3068375U&KC=U, 2 pages.

"Non-Final Office Action", U.S. Appl. No. 11/726,989, (Apr. 30, 2010), 11 pages.

"Non-Final Office Action", U.S. Appl. No. 13/025,747, (Mar. 29, 2012), 9 pages.

"Notice of Allowance", U.S. Appl. No. 11/726,989, (Nov. 16, 2010), 6 pages.

"Notice of Allowance", U.S. Appl. No. 13/025,747, (Sep. 12, 2012), 6 pages.

Beiroumi, Mohammad Z., et al., "Recovery Method Based on Communicating Extended Finite State Machine (EFSM) for Mobile Communication", retrieved from http://kmi.open.ac.uk/projects/buddyspace/docs/jabberconf02-eisenstadt-dzbor.pdf, (2005), 10 pages.

Fagg, Graham E., et al., "Fault Tolerant Communication Library and Applications for High Performance Computing", retrieved from http://lacsi.rice.edu/workspace/lacsidownloads/publications/LACSI2003_pap113.pdf, (2003), 10 pages.

Gray, Jim et al., "High Availability Computer Systems", retrieved from http://reserach.microsoft.com/~gray/papers/iee_HA_Swieorick.pdf, (1991), 19 pages.

Masayoshi, Serizawa "Thorough Comparison, vol. 177", *System optimization software, PCfan, Japan, Mainichi Communications*, vol. 12, No. 7, (Apr. 15, 2005), pp. 150-155.

Patterson, David et al., "Recovery Oriented Computing (ROC): Motivation, Definition, Techniques, Case Studies", retrieved from http://roc.cs.berkeley.edu.papers/ROC_TR02-1175.pdf, (Mar. 15, 2002), 16 pages.

Shibata, Koji "Diskeeper 10 Professional Premier Edition", *Windows Mode, Japan, Mainichi Communications, Inc.,*, (Sep. 29, 2006), p. 93.

"Foreign Office Action", KR Application No. 10-2009-7019458, Apr. 8, 2014, 9 Pages.

"Search Report", TW Application No. 97108534, Oct. 24, 2014, 1 pages.

"Foreign Notice of Allowance", KR Application No. 10-2009-7019458, Sep. 15, 2014, 4 pages.

SELF-MANAGED PROCESSING DEVICE

This application is a continuation of and claims priority under 35 U.S.C. §120 to U.S. patent application Ser. No. 13/025,747, titled "Self-Managed Processing Device" and filed on Feb. 11, 2011, which is a continuation of and claims priority under 35 U.S.C. §120 to U.S. patent application Ser. No. 11/726,989, titled "Self-Managed Processing Device" and filed on Mar. 23, 2007, now issued as U.S. Pat. No. 7,913,113, the disclosures of which are incorporated herein by reference in their entirety.

BACKGROUND

Some processing devices, such as, for example, personal computers (PCs), have built-in tools for maintaining the processing device. Generally, the built-in tools satisfy basic processing maintenance needs in isolation and may require a high level of computer expertise to properly use the built-in tools. Typically, processing device users do not consider configuring the built-in tools until either the processing device fails or data is lost. Further, the processing device users may install applications that cause the operating system to become unstable. When a processing device becomes unstable or fails to start up properly due to application instabilities, hardware configuration issues, data loss, human error or other problems, a processing device user may contact the processing device manufacturers, application developers, or technical support personnel, thereby increasing support costs. Further, system availability may be adversely affected because the system, or the processing device, may not be available until support personnel successfully address the problem or problems, or the processing device has been returned after having been sent out for repair.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Almost all problems that processing device users face today, except for hardware failures, may be caused because a change to a system state of a processing device is written to a non-volatile storage device. For example, the processing device may malfunction at a later time when the change is read. By contrast, processing devices that have only volatile storage or non-volatile read-only storage generally may not malfunction due to a change to a system state because the change cannot be persisted. Embodiments consistent with the subject matter of this disclosure may save a change to a system state of a processing device, or other processing device data in non-volatile storage.

In embodiments consistent with the subject matter of this disclosure, a self-managed processing device may be provided. The processing device may be a personal computer (PC), a laptop computer, or other processing device. The processing device may provide a number of services to protect the processing device and data stored thereon and may provide services for restoring the processing device to an operational state after a failure.

Embodiments of the processing device may provide protective services including, but not limited to, antivirus protection, antimalware protection, firewall protection, security patch management services, or other protective services. Further, the processing device may provide backup services for backing up and restoring user files, system files, configuration information, and other configuration information. The processing device may check or monitor performance conditions and may perform an action to improve performance based on the checked or monitored performance conditions. The processing device may monitor configuration and file changes and may provide a user with a capability to persist or discard the configuration changes and/or the file changes on a per-application basis or system wide. For example, in some embodiments, the user may be provided with the capability to persist or discard the configuration changes and/or the file changes at system boot, user login, user logoff, and system shutdown.

Some embodiments of the processing device may include a recovery button or switch, which when selected or pressed may cause the processing device to be restored to an operational state from a failed state, or may cause the processing device to prompt a user regarding one or more types of information the processing device is to restore. Various embodiments of the processing device may automatically detect instabilities and may automatically attempt to repair possible causes of the instabilities. Some embodiments of the processing device may include an additional chipset, or firmware code (for example, Basic Input Output System (BIOS), or other firmware code), which may perform backup and recovery services when the processing device may not otherwise be capable of recovering from a failure.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1A:
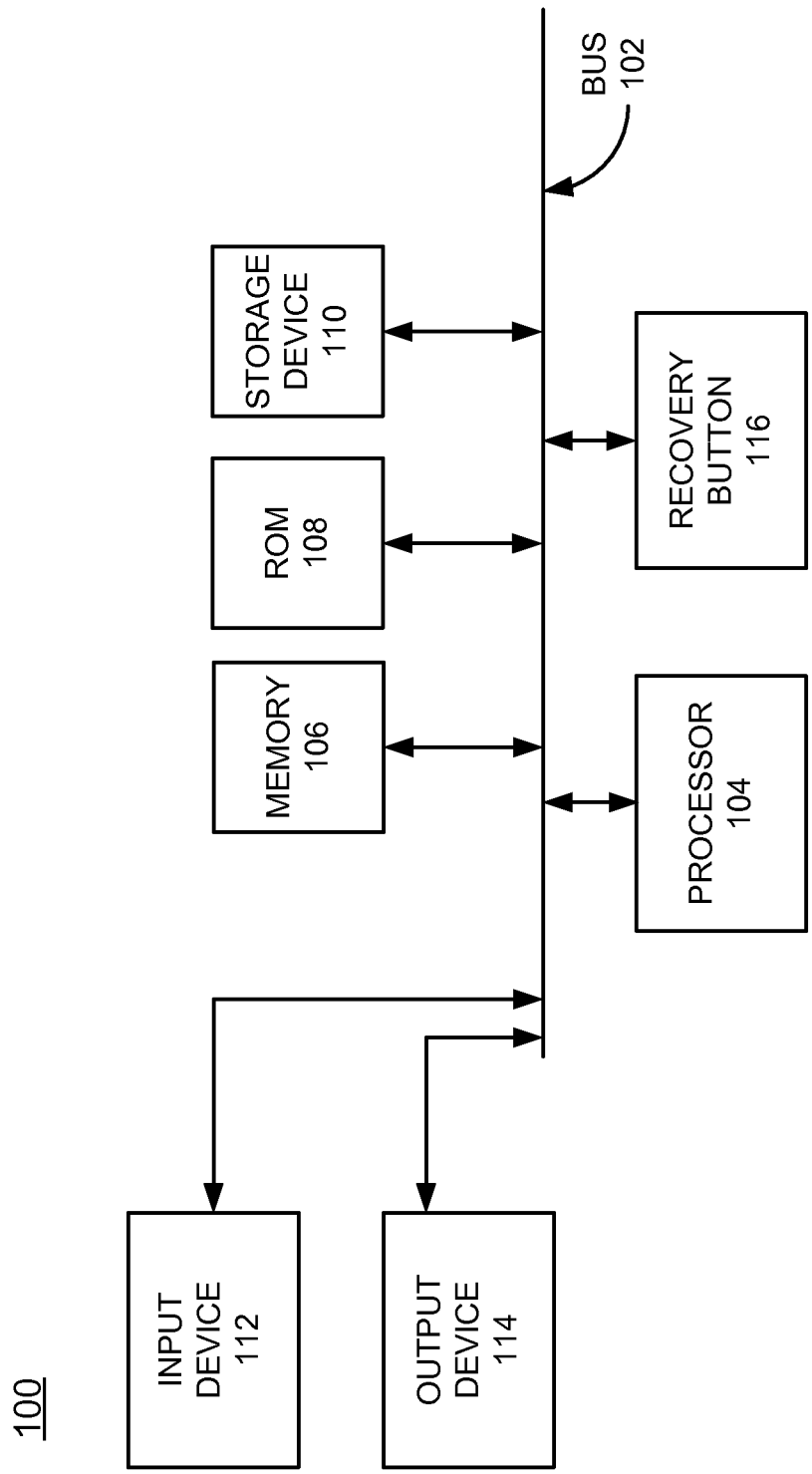
FIGS. 1A and 1B are functional block diagrams illustrating exemplary processing devices, which may be used in implementations consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a self-managing processing device may be provided. The processing device may be a personal computer (PC), a laptop computer, or other processing device. In various embodiments, the processing device may be configured to automatically provide protective services, such as, for example, antivirus protection, antimalware protection, firewall protection, security patch management services, or other protective services.

In some embodiments, the processing device may also include backup services for backing up and restoring user files, system files, such as, for example, drivers, and operating system files, as well as other system files, configuration information, such as, for example, Basic Input Output System (BIOS) settings, as well as other configuration information, or other information.

In some embodiments, the processing device may be configured to check one or more performance conditions and to perform an action to improve performance when the one or more performance conditions are detected. For example, in one embodiment, the processing device may periodically check file fragmentation of a storage device and may automatically perform defragmentation when the storage device has reached a predefined fragmentation level. Further, in some embodiments, the processing device may automatically set a page file size. The processing device may also perform other processing checks and subsequently may perform other actions in other embodiments when one or more performance conditions are detected.

In some embodiments, the processing device may monitor configuration and file changes and may provide a user with a capability to either persist or discard configuration changes and/or file changes made by an application.

Processing devices, in some embodiments, may include a recovery button or switch, which when selected or pressed may cause the processing device to be restored to an operational state. Further, when the recovery button is selected or pressed, the processing device may prompt the user regarding one or more types of information the processing device should restore.

Some processing devices, in embodiments consistent with the subject matter of this disclosure, may automatically detect instabilities, such as, for example, a failure to successfully boot an operating system, or other instabilities, and may automatically attempt to repair possible causes of the instabilities such that the processing devices may successfully boot the operating system.

Further, in some embodiments, processing devices may include an additional chipset, or firmware code (for example, BIOS, or other firmware code), which may perform backup and recovery services when the processing devices may not otherwise be capable of recovering from a failure.

Exemplary Processing Device

FIG. 1A is a functional block diagram that illustrates an exemplary processing device 100, which may be used to implement embodiments of a processing device consistent with the subject matter of this disclosure. Processing device 100 may include 2a bus 102, a processor 104, a memory 106, a read only memory (ROM) 108, a storage device 110, an input device 112, an output device 114, and a recovery button or switch 116. Bus 102 may permit communication among components of processing device 100.

Processor 104 may include at least one conventional processor or microprocessor that interprets and executes instructions. Memory 106 may be a random access memory (RAM) or another type of dynamic storage device that stores information and instructions for execution by processor 104. Memory 106 may also store temporary variables or other intermediate information used during execution of instructions by processor 104. ROM 108 may include a conventional ROM device or another type of static storage device that stores static information and instructions for processor 104. Storage device 110 may include any type of media for storing data and/or instructions. In some embodiments, storage device 110 may be a non-volatile storage device.

Input device 112 may include one or more conventional mechanisms that permit a user to input information to processing device 100, such as, for example, a keyboard, a mouse, or other input device. Output device 114 may include one or more conventional mechanisms that output information to the user, including a display, or other output device.

Recovery button or switch 116 may be a hardware button or switch which a user may press or select. Recovery button or switch 116 may be connected to processor 104 via bus 102. When recovery button or switch 116 is pressed or selected by the user, a signal may be sent to processor 104 to cause processor 104 to execute instructions for restoring processing device 100 to a stable state and to execute instructions for restoring system settings, system files, or user files, as well as other information.

Processing device 100 may perform such functions in response to processor 104 executing sequences of instructions contained in a tangible machine-readable medium, such as, for example, memory 106, or other media. Such instructions may be read into memory 130 from another machine-readable medium, such as storage device 110, or from a separate device via a communication interface (not shown).

Figure 1B:
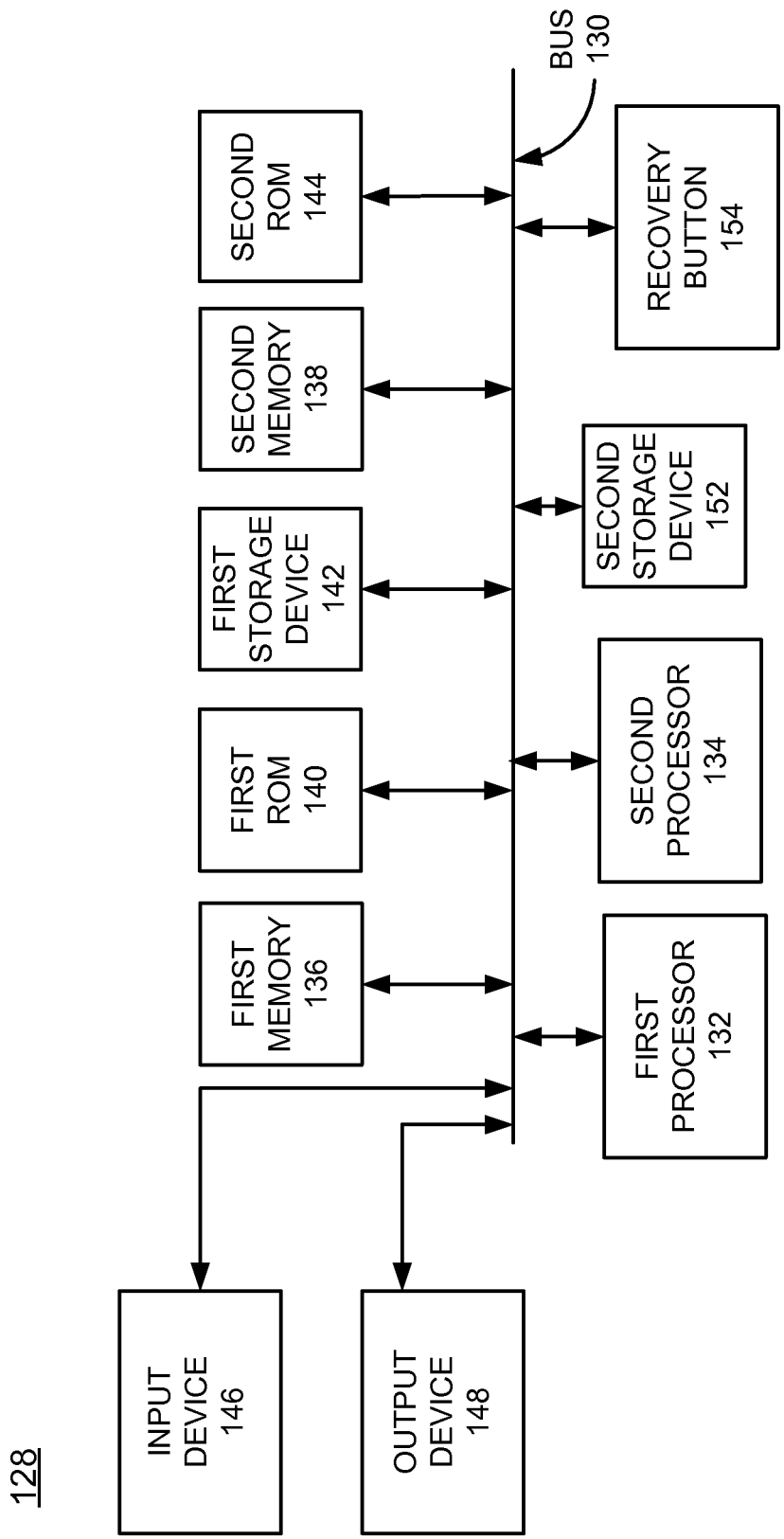

FIG. 1B is a functional block diagram that illustrates an exemplary processing device 128, which may be used to implement some embodiments consistent with the subject matter of this disclosure. Processing device 128 may include a bus 130, a first processor 132, a second processor 134, a first memory 136, a second memory 138, a first read only memory (ROM) 140, a second ROM 144, a first storage device 142, a second storage device 152, an input device 146, an output device 148 and a recovery button or switch 154. Bus 130 may permit communication among components of processing device 128.

Second processor 134, second memory 138, second ROM 144, and second storage device 152 may be included in a separate chipset in some embodiments. When processing device 128 experiences instabilities, or when processing device 128 is otherwise unable to recover from a failure, such as, for example, a failure to boot an operating system, or other failure, second processor 134, second ROM 144, and second storage device 152 may attempt to restore processing device 128 to a stable state and/or may restore system settings and files.

First processor 132 and second processor 134 may include at least one conventional processor or microprocessor that interprets and executes instructions. First memory 136 and second memory 138 may be random access memories (RAMs) or another type of dynamic storage device that stores information and instructions for execution by first processor 132 or second processor 134, respectively. First memory 136 and second memory 138 may also store temporary variables or other intermediate information used during execution of instructions by first processor 132 and second processor at 134, respectively. First ROM 140 and second ROM 144 may each include a conventional ROM device or another type of static storage device that stores static information and instructions for first processor 132 and second processor 134, respectively. First storage device 142 and second storage device 152 may each include any type of media for storing data and/or instructions. In some embodiments, the first storage device 142 and second storage device 152 may be nonvolatile storage devices.

Input device 146 may include one or more conventional mechanisms that permit a user to input information to processing device 128, such as, for example, a keyboard, a mouse, or other input device. Output device 148 may include one or more conventional mechanisms that output information to the user, including a display, or other output device.

Recovery button or switch 154 may be a hardware button or switch which a user may press or select. Recovery button or switch 154 may be connected to the first processor 132 via bus 130. When recovery button or switch 154 is pressed or selected by the user, a signal may be sent to first processor 132 to cause first processor 132 to execute instructions for restoring processing device 128 to a stable state and to execute instructions for restoring system settings, system files, or user files, as well as other information. In some embodiments, a software option may be provided to perform a function of recovery button or switch 154. In an alternative embodiment, when recovery button or switch 154 is pressed or selected by the user, a signal may be sent to second processor 134 via bus 130 to cause a second processor 134 to execute instructions to attempt to restore processing device 128 to a stable state and to execute instructions for restoring system settings, system files, or user files, as well as other information.

In some embodiments, second storage device 152 may include factory default restore data for restoring processing device 128 when processing device 128 cannot be restored to any other known a working state. Further, second storage device 152 may store information for persisting or discarding monitored changes stored on first storage device 142, such as, for example, metadata, or other information. Second storage device 152 may further include data and/or instructions for use in attempting to repair first storage device 140 to a working state.

Processing device 128 may perform such functions in response to first processor 132 or second processor 134 executing sequences of instructions contained in a tangible machine-readable medium, such as, for example, first memory 136, second memory 138, or other media. Such instructions may be read into first memory 136 or second memory 138 from another machine-readable medium, such as first storage device 142, second storage device 152, or from a separate device via a communication interface (not shown).

Exemplary Processing

Figure 2A:
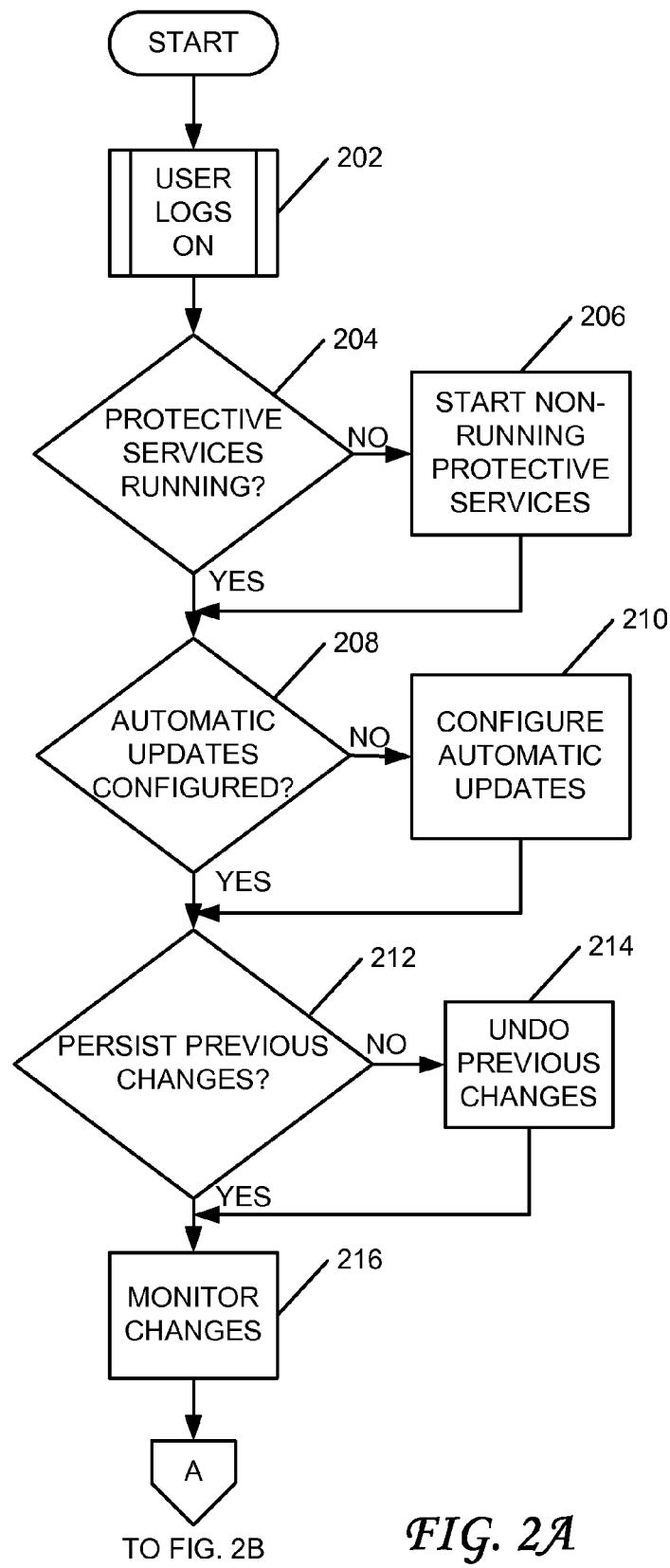
FIGS. 2A and 2B are flowcharts of an exemplary process for providing protective services and automatic updates and for persisting or discarding changes.
Figure 2B:
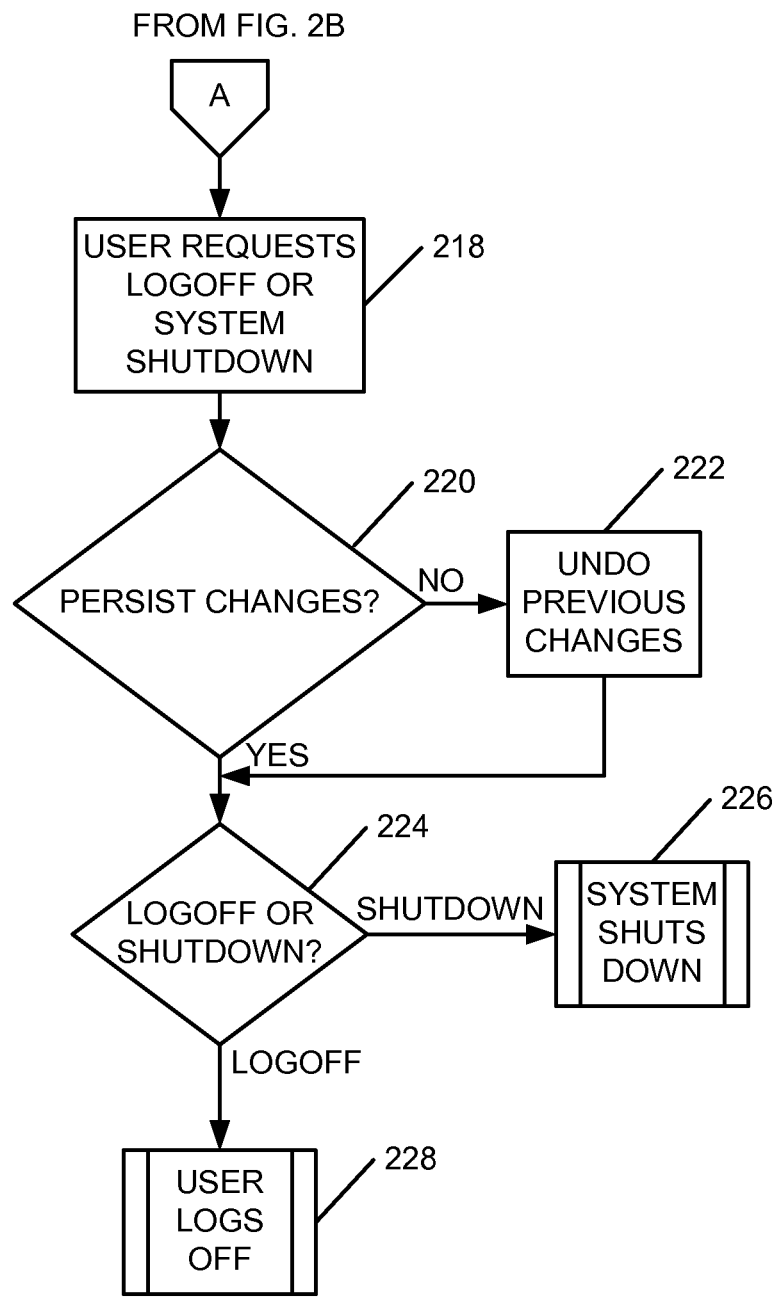

FIGS. 2A and 2B are flowcharts which illustrate exemplary processing in an embodiment consistent with the subject matter of this disclosure. The process may begin with a user logging on to a processing device, such as, for example, processing device 100 or processing device 128 (act 202). The processing device may then determine whether protective services are executing (act 204). The protective services may include, but not be limited to, antivirus services, security patch management services, firewall services, or other protective services. If the processing device determines that any of the protective services are not running or executing, then the processing device may automatically start the non-running protective services (act 206).

Next, the processing device may determine whether the processing device is configured to automatically receive updates for system software (act 208). If the processing device is not configured to automatically receive updates for the system software, then the processing device may configure itself to automatically receive updates for the system software (act 210).

The processing device may then determine whether previous changes made in a previous session are to be persisted (act 212). The previous changes may have been monitored by the processing device and may include system file changes, user file changes, BIOS setting changes, or other changes made by a user or an application during the previous session. In some embodiments, metadata, or other information, representing the previous changes to system files, user files, BIOS settings, or other data, stored on a first storage device, may be stored on a separate storage device. In an alternate embodiment, instead of storing the metadata on the separate storage device, the metadata may be stored in a particular area of the first storage device.

If the processing device determines that the previous changes are not to be persisted, then the processing device may undo the changes, such that the processing system files, user files, BIOS settings, or other changes may be restored or rolled back to a respective pre-changed state (act 214). In some embodiments, the processing device may determine not to persist the previous changes if the previous changes include unauthorized changes, or changes that may introduce instability or a bad configuration. In some embodiments, a user, such as, for example, a system administrator, may configure the processing device to permit changes to system files, user files, BIOS settings, or other changes which will be automatically discarded when the user logs in again, when the user logs off, when the processing device shuts down, or when the processing device starts up, or is booted.

Next, the processing device may monitor changes made to the processing device, such as, for example, system file changes, user file changes, BIOS setting changes, or other changes (act 216).

At some point later, the user may request to be logged off the processing device or the processing device may be shut down (act 218; FIG. 2B). The processing device may then determine whether to persist the monitored changes (act 220). If the processing device determines that the monitored changes are not to be persisted, then the processing device may undo the changes, such that the processing system files, user files, BIOS settings, or other changes may be restored or rolled back to a respective pre-changed state (act 222).

The processing device may then determine whether a user logoff or a processing device shutdown was requested (act 224). If a user logoff was requested, then the user may be logged off (act 228). If a processing device shutdown was requested, then the processing device may be shutdown (act 226).

Figure 3:
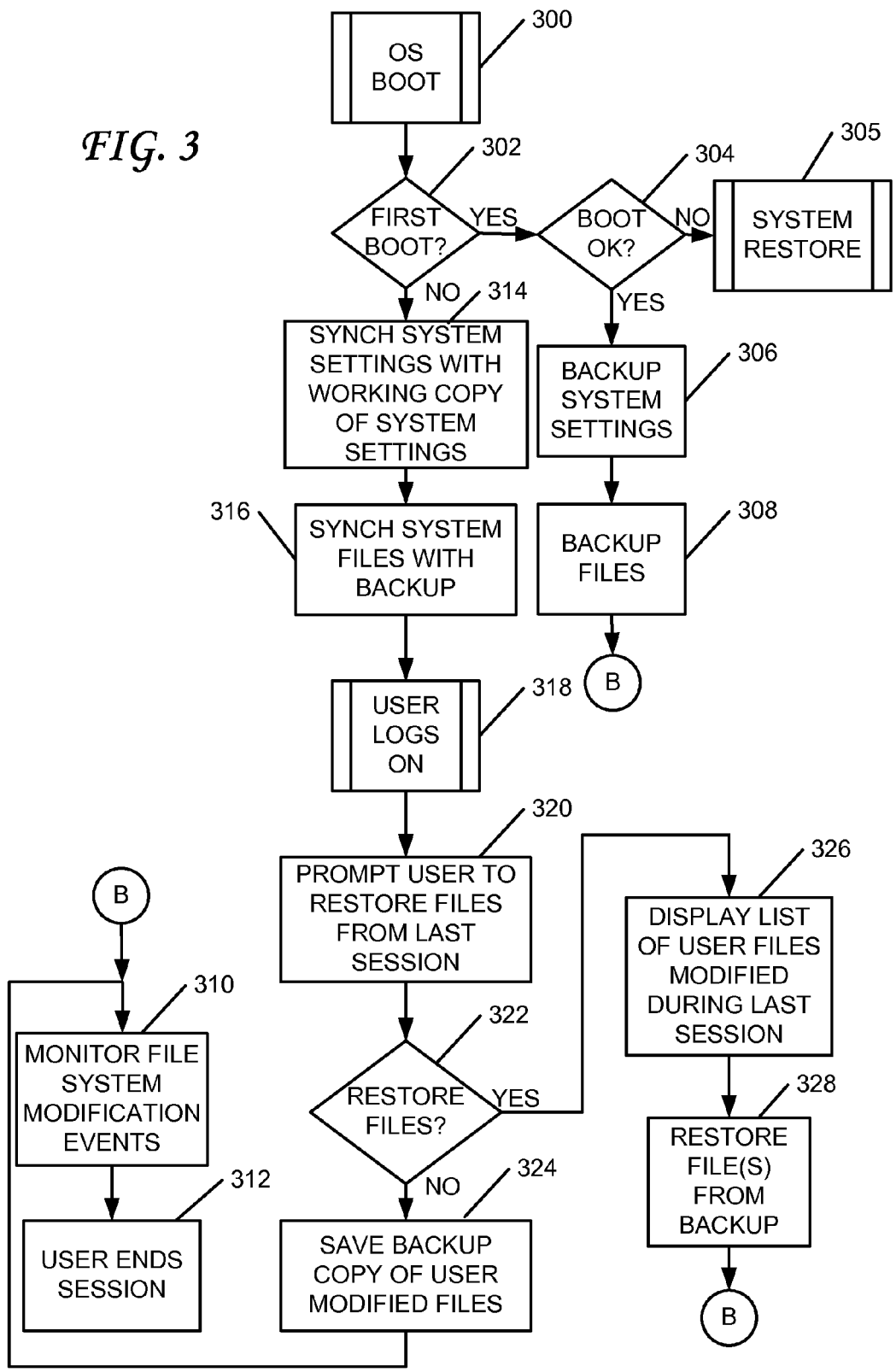
FIG. 3 is a flowchart of an exemplary process for maintaining a backup of system settings and system files and for providing a capability for restoring files from a previous session.

FIG. 3 is a flowchart which illustrates an exemplary process to maintain stability of a processing device in embodiments consistent with the subject matter of this disclosure. The process may begin with a processing device, such as, for example, processing device 100 or processing device 128, booting the operating system (act 300). The processing device may then determine whether the booting of the operating system is a first booting of the operating system (act 302). If this is a first booting of the operating system, then the processing device may determine whether the first booting of the operating system was successful (act 304). If the first booting of the operating system was not successful, then the processing device may attempt to restore the processing device to an operational state using factory restore data, which may include factory default settings. In some embodiments, the factory restore data may be stored in a storage device separate from the storage device for storing system files, user data, and BIOS settings.

If the first booting of the operating system was successful, then the processing device may backup system settings, such as, for example, BIOS settings, or other system settings, to a storage device, such as, for example, a backup storage device, or other storage device (act 306). The processing device may then backup files, such as, for example, system files to the storage device (act 308). The processing device may then monitor file system modification events in order to keep track of any file system changes (act 310). Next, a user may end a session by, for example, logging off of the processing device or shutting down the processing device (act 312).

If the processing device determines, during act 302, that the booting of the operating system is not the first booting of the operating system, then the processing device may synchronize system settings, such as, for example, BIOS settings, or other settings, with a last known set of working system settings (act 314). Thus, the last known set of working system settings may be updated to reflect new system settings. The processing device may then synchronize system files with the backed up files (act 316). In this way, the backed up system files may be updated.

Next, the user may log on to the processing device (act 318). The processing device may prompt the user regarding whether user files should be restored to a state as they existed at the beginning of a last session (act 320). The processing device may then determine whether the user files are to be restored, based on the user's response to the prompt (act 322). If the user files are not to be restored, then the processing device may save a backup copy of user modified files (act 324) and the processing device may monitor file system modification events in order to keep track of any file system changes (act 310). The user may then end the session by, for example, logging off of the processing device or shutting down the processing device (act 312).

If, during act 322, the processing device determines that the user files are to be restored to the state as they existed at the beginning of the last session, then the processing device may display a list of user files modified during the last session (act 326) and the processing device may restore the user files from a backup copy (act 328). The processing device may then perform acts 310 and 312.

Figure 4:
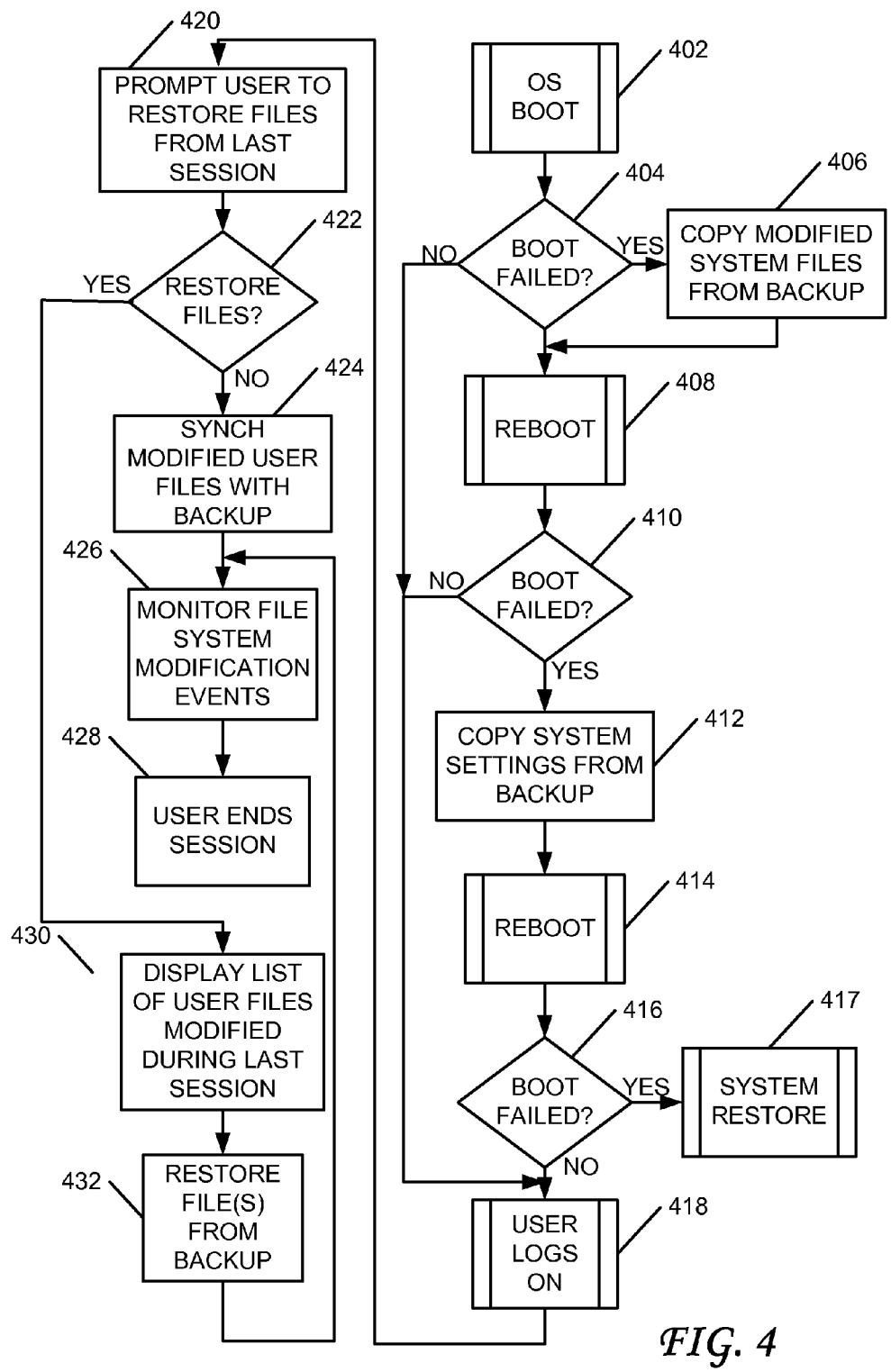
FIG. 4 is a flowchart of an exemplary process for detecting instabilities and automatically attempting to repair the instabilities, as well as for providing an ability to restore files.

FIG. 4 is a flowchart of an exemplary process that may be executed by a processing device consistent with the subject matter of this disclosure. The exemplary process illustrated in FIG. 4 may provide a restoration service to restore the processing device to a stable state and to restore user modified files to a previous state.

The process may begin with the processing device booting the operating system (act 402). The processing device may then automatically determine whether the boot of the operating system failed (act 404). If the boot of the operating system failed, then the processing device may automatically copy or restore one or more modified system files from a backup (act 406). The processing device may then attempt to re-boot the operating system (act 408). The processing device may then automatically determine whether the reboot of the operating system failed (act 410). If the reboot of the operating system failed, then the processing device may automatically copy or restore system settings, such as, for example, BIOS settings, system files, or other system settings from a backup (act 412). The processing device may then attempt another reboot of the operating system (act 414). The processing device then may determine whether the other reboot of the operating system failed (act 416). If the other reboot of the operating system failed, then the processing device perform a complete system restore (act 417). In some embodiments, the complete system restore may restore the processing device using factory restore data, which may be stored in a storage device separate from a storage device for storing system settings, system files, and user data.

If the processing device determined that the boot of the operating system was successful, at acts 404, 410, or 416, then a user may log on to the processing device (act 418). After logging on to the processing device, the processing device may prompt the user regarding whether the user wishes to restore files from a last session (act 420). The processing device may then determine whether the user wishes to restore files, based on a response, provided by the user, when prompted during act 420 (act 422). In some embodiments, all users may not be authorized to perform all operations, such as, for example, restoring files, or other operations. For example, some users, such as, administrators, may be authorized to restore the processing device using factory restore data, and other users may be authorized to restore user settings and user files and system files that should not be changed. In such embodiments, users not authorized to restore files may not be prompted regarding restoration of the files.

If the user does not indicate that files are to be restored, then the processing device may synchronize user files modified during a last session with a backup copy of user files (act 424). The processing device may then monitor file system modification events, which may include, but not be limited to, events related to creating a new file, deleting a file, or modifying a file (act 426). The user may then end a session by, for example, logging off of the processing device or shutting down the processing device (act 428).

If, during act 422, the processing device determines that the files from the last session are to be restored then the processing device may display a list of user files modified during the last session (act 430). The processing device may then restore the listed files from a backup (act 432). The processing device may then monitor the file system modification events such as, for example, addition of new user files, revision of existing user files, deletion of user files, or other file system modification events (act 426). The user may end the session by, for example, logging off or shutting down the processing device user (act 428).

Figure 5:
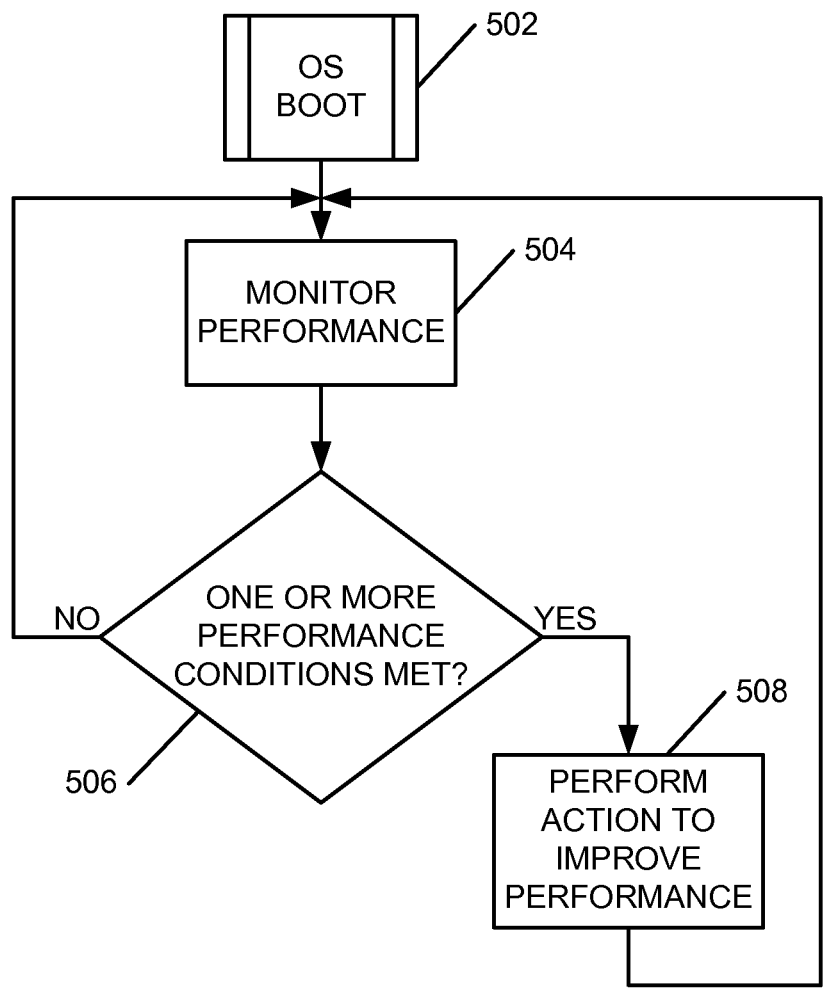
FIG. 5 is a flowchart of an exemplary process for monitoring performance of a processing device and automatically performing an action to improve the performance.

FIG. 5 is a flowchart illustrating another exemplary process which may be performed in an embodiment of a processing device consistent with the subject matter of this disclosure. First, the processing device may boot the operating system (act 502). After booting the operating system, the processing device may monitor performance (act 504). For example, the processing device may monitor a level of disk fragmentation, a configured page file size, memory usage, or other performance metrics. Next, the processing device may determine whether one or more performance conditions are met (act 506) and, if the one or more performance conditions are met, then the processing device may automatically perform an action to improve performance (act 508). If the processing device determines that the one or more performance conditions are not met, then the processing device may repeat acts 504 and 506.

As an example, the processing device may determine that the disk fragmentation is above a certain level, such as 10%, or another percentage. If the disk fragmentation is above the certain level, the processing device may automatically perform an action to improve performance, such as defragmentation. As another example, if the processing device determines that memory usage is above a certain level, then the processing device may determine that one or more applications are taking up space in memory and that the applications are rarely used. In such a case, the processing device may automatically remove the applications from memory, or the processing device may prompt the user regarding whether the applications may be removed from memory.

Figures 6A, 6B:
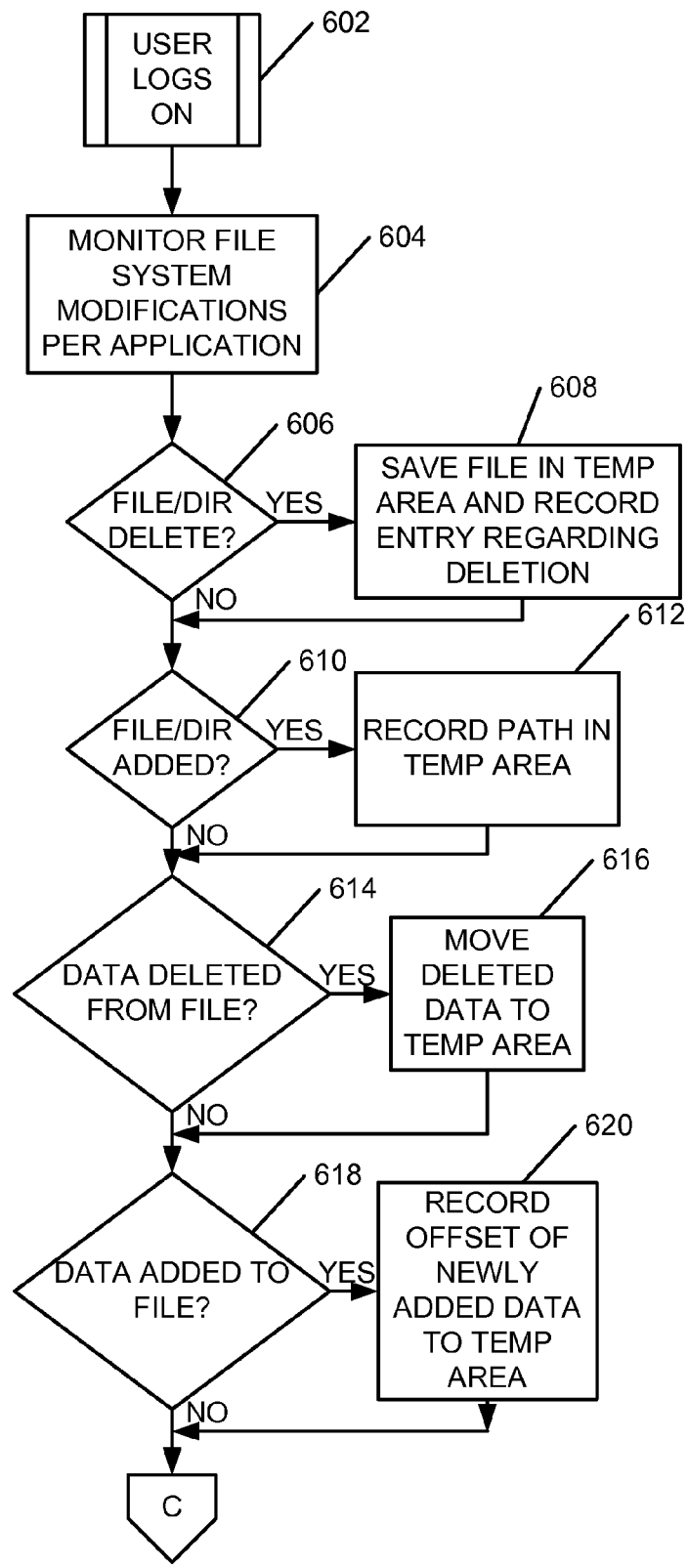
FIGS. 6A and 6B are flowcharts of an exemplary process for monitoring changes made to files and directories and persisting or discarding the monitored changes.
Figure 6B:
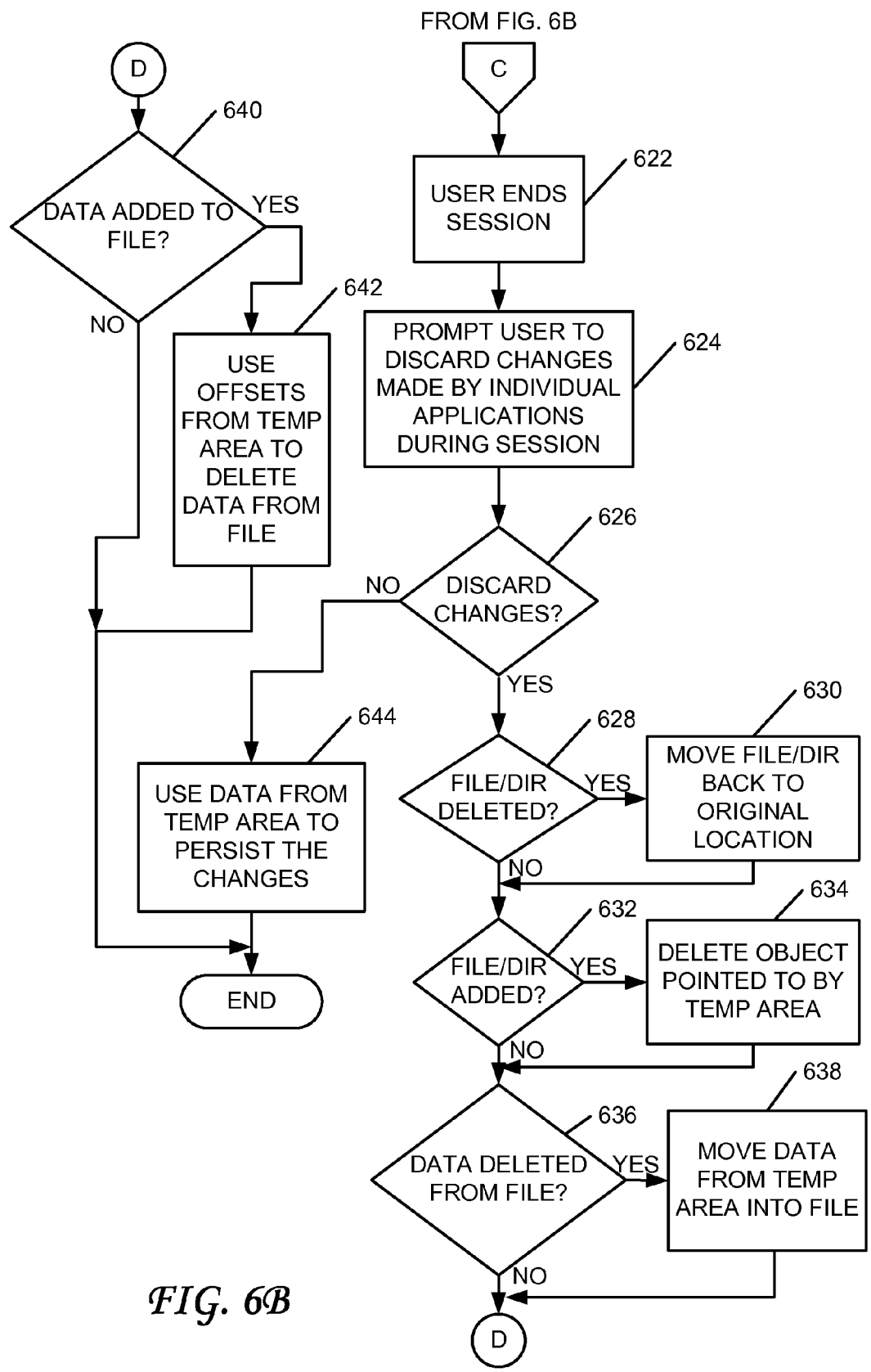

FIGS. 6A-6B are flowcharts illustrating an exemplary process that may be implemented in an embodiment of a processing device in which changes made to one or more files may be monitored on a per-application basis during a session. First, a user may log on to the processing device (act 602). Next, the processing device may monitor file system modifications on a per application basis (act 604). If the processing device determines that a file or directory has been deleted (act 606), then the deleted file or directory may be saved in a temporary storage area of a medium and an entry may be recorded in the temporary storage area for storing information with respect to deleted files or directories (act 608). If the processing device determines that a file or directory has been added (act 610), then a path for the file or directory may be recorded in the temporary storage area by the processing device (act 612). If the processing device determines that data has been deleted from a file (act 614), then the processing device may move the deleted data to the temporary storage area (act 616). If the processing device determines that data has been added to a file (act 618), then an offset of the newly added data in the file may be recorded in the temporary storage area (act 620).

Next, the user may end a session by, for example, logging off of the processing device or shutting down the processing device (act 622; FIG. 6B). The processing device may then prompt the user regarding whether changes made by individual applications during the session are to be discarded (act 624). In an alternate embodiment, a system administrator, or other user, may configure the processing device to always discard changes made by individual applications during the session. Next, the processing device may determine whether the changes are to be discarded based upon the user's response to the prompt (act 626). If the changes are not to be discarded, then the information recorded in the temporary storage area, regarding the changes, may be used to persist the changes (act 644).

If, during act 626, the processing device determines that the changes made by the individual applications during the session are to be discarded, then the processing device may determine whether any of the changes included deletion of a file or a directory (act 628). If the changes include the deletion of a file or a directory, then the processing device may move the file or directory, saved in the temporary storage area, back to its original location (act 630). The processing device may then determine whether the changes include an addition of a file or a directory (act 632). If so, then the processing device may delete the file or directory pointed to by the entry recorded in the temporary storage area during act 612 (act 634). The processing device may then determine whether the changes include data being deleted from a file (act 636). If so, the processing device may move the saved deleted data from the temporary storage area back into the file (act 638). Next, the processing device may determine whether the changes include data being added to a file (act 640). If so, the processing device may use offsets recorded in the temporary storage area (during act 620) to delete the data added to the file.

Figure 7A:
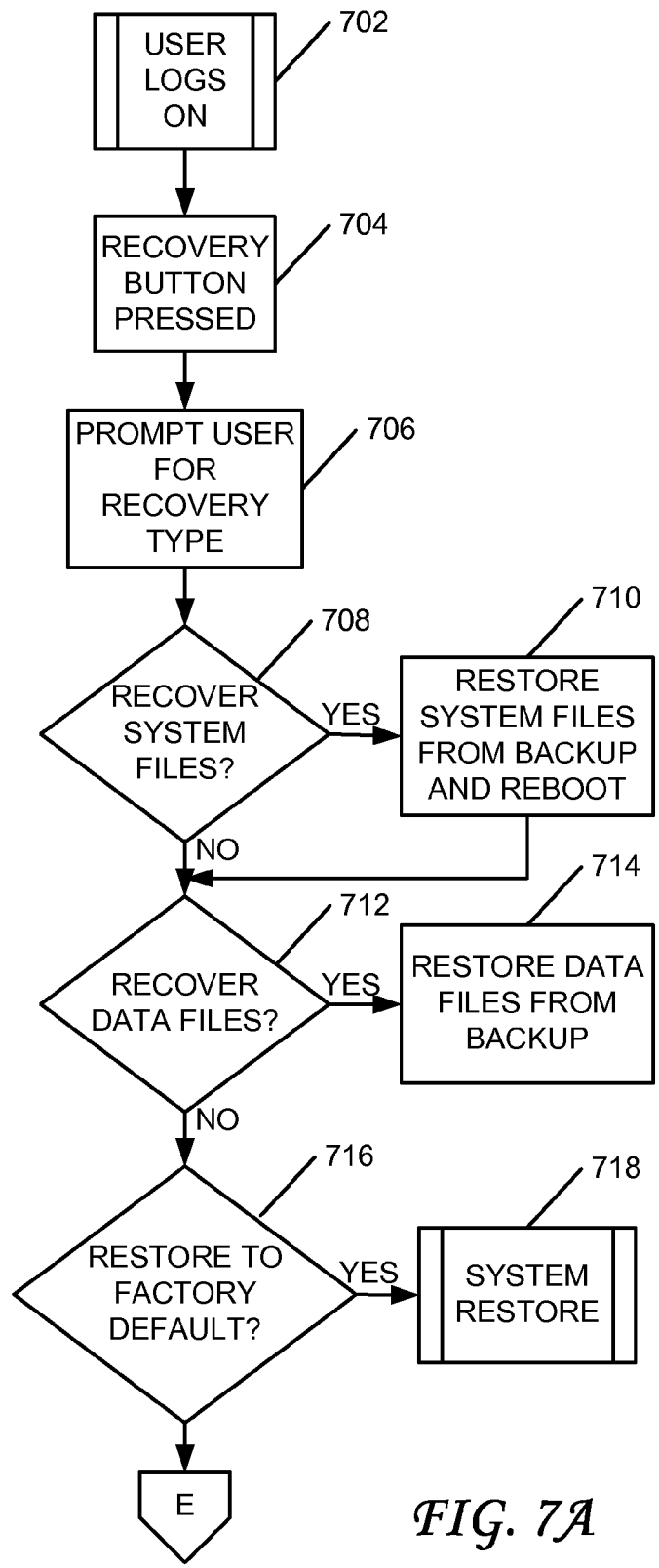
FIGS. 7A and 7B are flowcharts of an exemplary process for performing a recovery action after a recovery button switch is pressed or selected.
Figure 7B:
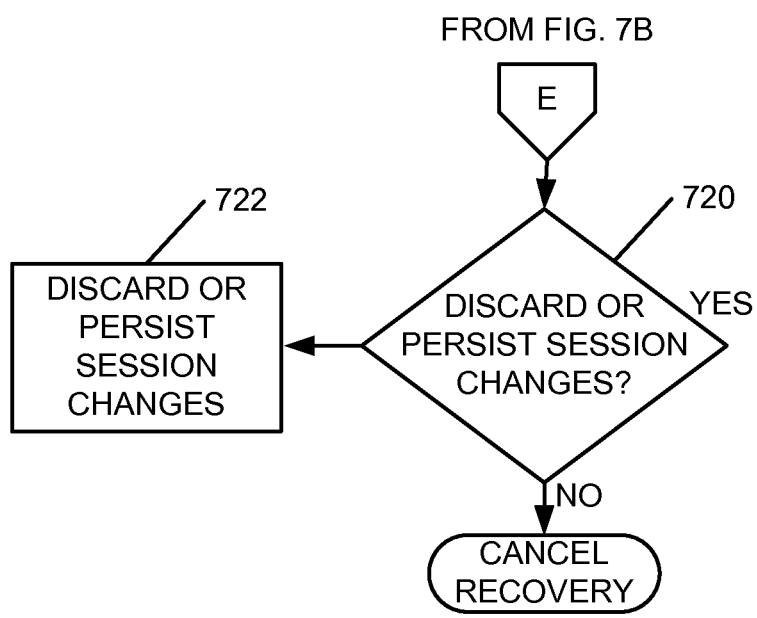

FIGS. 7A and 7B illustrate flowcharts of an exemplary process that may be implemented in an embodiment of the processing device consistent with the subject matter of this disclosure. The process may be performed when a recovery button or switch is pressed or selected. First, a user may log on to the processing device (act 702). The user may select or press a recovery button or switch of the processing device (acts 704). The pressing or selection of the recovery button or switch may cause a signal to be sent to a processor of the processing device, thereby causing the processing device to prompt the user for a type of recovery (act 706). In this exemplary embodiment the recovery types may include: system file recovery; data file recovery; restore processing device to factory default; and discard or persist session changes. In other embodiments, additional or different recovery types may be included.

The processing device may then determine whether system files are to be recovered (act 708). If the system files are to be recovered, the processing device may restore the system files from a backup copy and may reboot (act 710).

The processing device then may determine whether data files are to be recovered (act 712). If the processing device determines that the data files are to be recovered, then the processing device may restore data files from a backup copy (act 714).

If the data files are not to be recovered, then processing device may determine whether the processing device is to be restored using factory restore data, which may include factory default settings (act 716). If the processing device determines that the processing device is to be restored using factory restore data, then the processing device may perform a system restore, using the factory restore data, to restore the processing device to an operational state (act 718).

If the processing device is not to be restored using the factory restore data, then the processing device may determine whether changes made during a session are to be discarded or persisted (act 720; FIG. 7B). If the processing device determines that the changes made during a session are to be discarded or persisted, then the processing device may discard or persist the changes made during the session (act 722).

If the processing device determines that the recovery type does not include discarding or persisting session changes, then the processing device may cancel recovery.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method of restoring a file system executable on a processing device comprising:
   performing a backup of the file system;
   monitoring changes made to the file system on a per application basis;
   automatically detecting whether at least one system instability exists; and in response to detecting that at least one system instability exists, attempting to restore the file system by removing the changes made to the file system.

2. The method of claim 1, wherein the backup is performed responsive to a successful boot of the processing device.

3. The method of claim 1, wherein the backup is performed during a first session and the monitoring, automatically detecting, and attempting are performed during a second session subsequent to the first session.

4. The method of claim 1, wherein the backup, monitoring, automatically detecting, and attempting are performed within a particular session to restore the file system during the session.

5. The method of claim 1, wherein the attempting to restore the file system comprises using the backup of the file system to undo the changes made to the file system.

6. The method of claim 1, wherein attempting to restore the file system comprises prompting a user regarding whether changes made during a session are to be persisted or discarded after detecting the at least one system instability.

7. The method of claim 1, wherein automatically detecting comprises detecting a failed start-up of the processing device.

8. The method of claim 1, wherein the changes include at least changes to settings for an operating system that cause the operating system to become unstable.

9. The method of claim 1, further comprising monitoring changes made to the file system on a system-wide basis.

10. A processing device comprising:
at least one processor;
a memory having instructions executable by the at least one processor to perform operations to restore a file system of the processing device including:
performing a backup of the file system;
monitoring changes made to the file system including changes made to user files and changes made to system files;
automatically detecting whether at least one system instability exists; and
in response to detecting that at least one system instability exists, attempting to restore the file system by removing the changes made to the user files and the system files.

11. The processing device of claim 10, wherein the backup is performed responsive to a successful boot of an operating system for the processing device to update a last known set of working system settings for the processing device.

12. The processing device of claim 10, further comprising:
a recovery button operable to initiate a user-selected attempt to restore the file system to a stable state by removing the changes made to the file system.

13. The processing device of claim 10, wherein the memory further comprises:
instructions for monitoring file system changes per session; and
instructions for undoing the file system changes made during a session.

14. The processing device of claim 10, wherein the memory further comprises:
instructions for monitoring changes to the file system on a per application basis; and
instructions for permitting a user to cause a selective rollback of changes to the file system on a per application basis.

15. A system comprising:
at least one processor;
a memory having instructions executable by the at least one processor to perform operations including:
performing a backup of the file system;
monitoring changes made to the file system on a per application basis;
automatically detecting whether at least one system instability exists; and
in response to detecting that at least one system instability exists, attempting to restore the file system by removing the changes made to the file system using the backup of the file system.

16. The system of claim 15, wherein the backup is performed during a first session and the monitoring, automatically detecting, and attempting are performed during a second session subsequent to the first session.

17. The system of claim 15, wherein the backup, monitoring, automatically detecting, and attempting are performed within a particular session to restore the file system during the session.

18. A method executable on a processing device comprising:
performing a backup of the file system;
monitoring changes made to the file system including changes made to user files and changes made to system files;
automatically detecting whether at least one system instability exists; and
in response to detecting that at least one system instability exists, attempting to restore the file system by removing the changes made to the user files and the system files.

19. The method of claim 18, wherein the backup is performed responsive to a successful boot of an operating system for the processing device to update a last known set of working system settings for the processing device.

20. The method of claim 18, further comprising:
monitoring file system changes per session; and
undoing the file system changes made during a session.

* * * * *